United States Patent
Downey, Jr. et al.

(10) Patent No.: US 6,529,443 B2
(45) Date of Patent: Mar. 4, 2003

(54) TWO-CONDUCTOR BIDIRECTIONAL DIGITAL SEISMIC TELEMETRY INTERFACE

(75) Inventors: John C. Downey, Jr., Houston, TX (US); Ralph Kruse, Houston, TX (US); Allen J. Bishop, Richmond, TX (US); Kent A. Byerly, Seabrook, TX (US)

(73) Assignee: Input/Output, Inc., Stafford, TX (US)

( * ) Notice: Subject to any disclaimer, the term of this patent is extended or adjusted under 35 U.S.C. 154(b) by 117 days.

(21) Appl. No.: 09/757,830

(22) Filed: Jan. 10, 2001

(65) Prior Publication Data

US 2002/0126574 A1 Sep. 12, 2002

Related U.S. Application Data

(60) Provisional application No. 60/175,500, filed on Jan. 11, 2000.

(51) Int. Cl.[7] .................................................. G01V 1/00
(52) U.S. Cl. ..................................... 367/76; 340/870.18
(58) Field of Search ............................... 367/76, 20, 66, 367/80; 340/870.18, 870.26, 854.9

(56) References Cited

U.S. PATENT DOCUMENTS

| | | |
|---|---|---|
| 4,041,442 A | 8/1977 | Marquardt |
| 4,638,480 A | 1/1987 | Darton |
| 5,200,930 A * | 4/1993 | Rouquette .................... 367/76 |

FOREIGN PATENT DOCUMENTS

| | | |
|---|---|---|
| EP | 0330784 A2 | 9/1989 |
| EP | 0552769 A3 | 7/1993 |
| GB | 1295332 | 11/1972 |

OTHER PUBLICATIONS

International Search Report, PCT/US01/00787, May 17, 2001.

* cited by examiner

Primary Examiner—Gregory J. Toatley, Jr.
(74) Attorney, Agent, or Firm—James T. Cronvich

(57) ABSTRACT

A two-conductor bidirectional digital telemetry interface between a seismic sensor acquisition/conversion module and a seismic data collection module. The data collection module is configured as a master electronics device and the sensor acquisition/conversion module is configured as a slave electronics device in the telemetry system. The master device provides power to the slave device over the two conductors. The master device transmits portions of commands to the slave device at a first time and the slave device transmits portions of a digital seismic data packet to the master at a different second time in a fixed-duration frame. The frames are transmitted at regular intervals. The outbound commands and inbound data are encoded by block codes. A phase-locked loop in the slave is locked to a master clock in the master by deriving a clock and a sync point from the block-coded commands it receives from the master. The block code representing each command bit minimizes dc drift and provides a level transition in the command that can be used to maintain synchronism between master and slave.

24 Claims, 4 Drawing Sheets

TWO-CONDUCTOR BIDIRECTIONAL DIGITAL SEISMIC TELEMETRY INTERFACE

REFERENCE TO RELATED APPLICATIONS

This application claims the benefit of U.S. Provisional Application Serial No. 60/175,500, filed Jan. 11, 2000.

TECHNICAL FIELD

The invention relates generally to seismic prospecting and, more specifically, to telemetry between a master electronics module, such as a data collector, and one or more slave electronics modules, such as seismic sensor data acquisition modules.

BACKGROUND

Conventional geophones and hydrophones used in seismic prospecting each have a dedicated two-wire connection to conduct analog seismic signals to acquisition/conversion circuitry. The analog signals from one or more remote seismic sensors (hydrophones, geophones, or other seismic sensors) are sampled and converted to a series of digital values by the acquisition/conversion circuitry. The acquisition/conversion circuitry is typically configurable to, for example, adjust the sampling rate, alter any digital filtering or other digital signal processing parameters, or perform diagnostics.

One or more of these acquisition/conversion circuits are connected to a data collection unit. Each data collection unit collects the series of digital values for all the seismic sensors connected to all the acquisition/conversion units connected to it. The data collection unit passes that data to a seismic recording system, including a system controller, over a high-speed data link, such as a fiber-optic cable.

Conventionally, however, the digital interface between an acquisition/conversion unit and a data collection unit has comprised at least four wires in two pairs: two wires (one pair) used for a digital command signal to the acquisition/conversion unit and two wires (the other pair) for the digital seismic data from the acquisition/conversion unit. In addition, power is supplied to the acquisition/conversion unit over the "phantom pair" formed by the two pairs of telemetry wires or over separate dedicated power wires.

Although the conventional four-wire telemetry works, it does have shortcomings. First, the weight of a cable depends on the number of wires and the concomitant amount of copper it contains. Second, the diameter of a cable depends on the number and size of wires it encases. Third, more wires require more connections to be made, which increases the chances of incorrect or unreliable connections.

It should be clear that there is a need for a smaller, lightweight, standard physical interface that can send commands and deliver power from a data collector to one or more remote sensor acquisition conversion units and transmit seismic data from the sensor acquisition/conversion units to a data collector.

SUMMARY

The shortcomings of conventional seismic telemetry systems are overcome and the needs satisfied by a two-conductor bidirectional digital seismic interface having features of the invention. The interface comprises a two-conductor line connected between a master electronics module, such as a data collection module, and a slave electronics module, such as a seismic sensor electronics module. Digital commands are transmitted from the master electronics module to the slave sensor electronics module in one direction along the two-conductor line. Digital data from the slave sensor module are transmitted back to the master module in the opposite direction over the same pair of conductors to form a bidirectional interface. The slave module includes a phase-locked loop that derives clock information from the outbound command signal to keep the loop locked for coherent data acquisition and to derive a synchronization, or sync, point for properly decoding commands issued by the master. Block codes used by the master to encode the command bits that constitute a given command are selected to guarantee a level transition coincident with the sync point in the slave and to minimize dc drift. In this way, the slave remains synchronized with the master to enable synchronized bidirectional telemetry.

In a preferred version of the telemetry interface, the master transmits a synchronization pattern to lock the phase-locked loops in the slaves and to establish the sync point. Portions of outbound command bits and inbound data are confined to individual fixed-duration frames. Complete commands and data are apportioned among consecutive frames.

The slaves are preferably powered by a dc power supply at the master connected across the two-conductor pair. In this way, only two conductors are needed to handle bidirectional telemetry and to supply power, instead of the conventional four or more. This allows digital sensors to be used in place of analog sensors with only minor modifications of master and slave electronics.

BRIEF DESCRIPTION OF THE DRAWINGS

These features, advantages, and aspects of the invention are better understood by reference to the following description, appended claims, and accompanying drawings in which:

DETAILED DESCRIPTION OF THE PREFERRED EMBODIMENT

Figure 1:
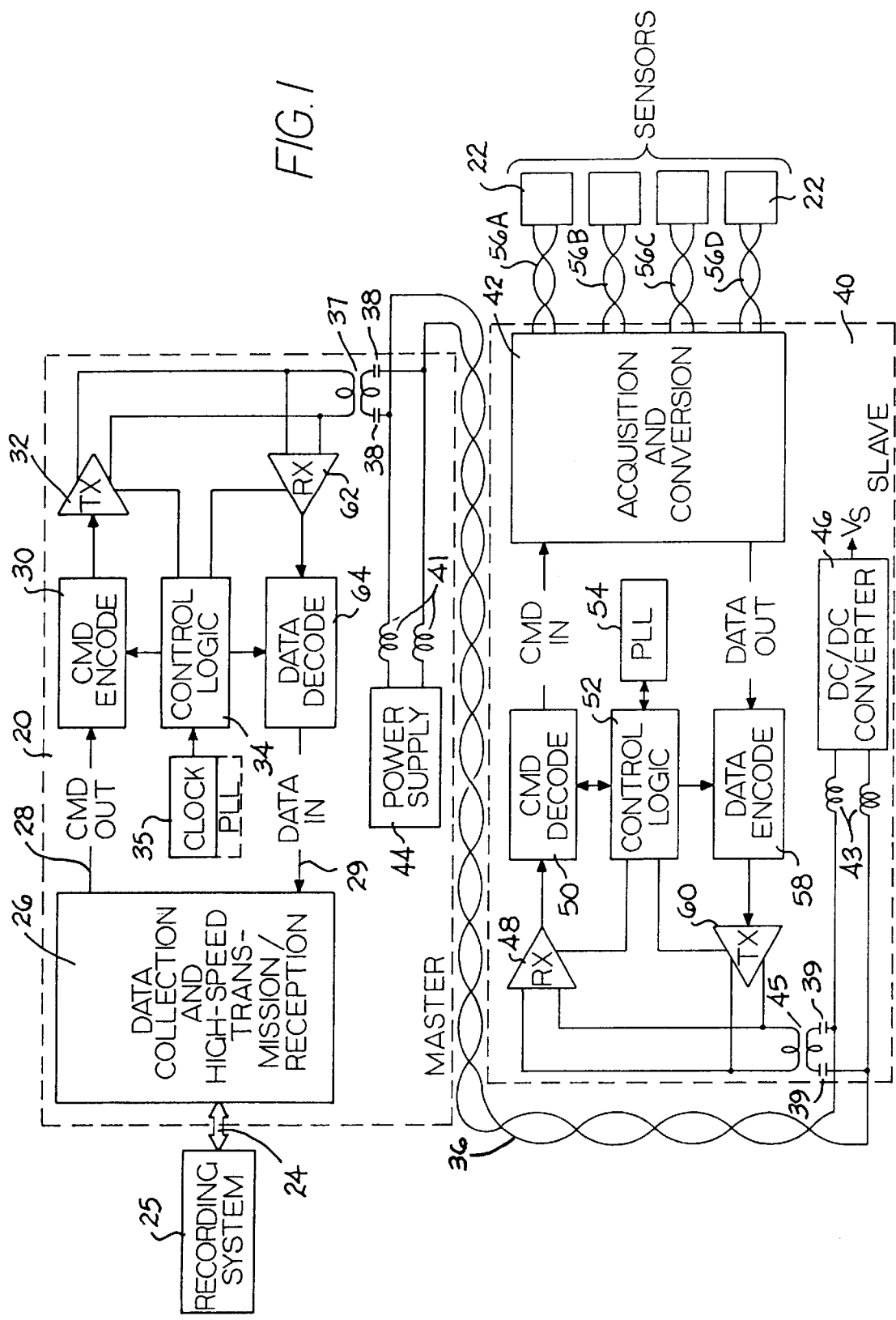
FIG. 1 is a schematic block diagram of a two-conductor telemetry interface embodying features of the invention.

A specific example of the two-conductor telemetry interface embodying features of the invention is shown in the schematic block diagram of FIG. 1. A master electronics module 20 includes data collection circuitry for collecting data from a number of remote sensors 22, which may be geophones, hydrophones, or other seismic-sensitive devices used in seismic prospecting—land or marine. The seismic data from the sensors are collected and transmitted over a high-speed data link 24, such as a fiber-optic cable, to a central recording system 25. The central recording system includes a main controller configuring the seismic data collection system and issuing supervisory commands to the master module over the high-speed link. Conventional electronic circuits and/or firmware are used to implement the data collection and high-speed interface indicated by block 26. The block 26 preferably includes digital logic to format an outbound command on CMD OUT line 28 and other digital logic to receive formatted data bytes inbound on DATA IN line 29. The data collector 26 combines the data from all the remote sensors, organizes the data, and transmits the data to the recording system over the high-speed link.

The master module telemetry interface circuits include, in the outbound command path, an encoder 30 and a differential line transmitter 32. (For the purposes of this specification, the term "outbound" refers to signals directed from the recording system toward the sensor; the term "inbound" refers to signals directed oppositely.) Control logic 34 in the master module controls the bit timing of the outbound encoder 30 in synchronism with a stable and accurate master clock 35, which may optionally be realized with a phase-locked loop (PLL). The control logic also controls the state of the transmitter 32, turning it on when a command is to be transmitted outbound and turning it off otherwise. Encoded outbound commands are coupled onto a two-conductor line 36, preferably a twisted pair, through a transformer 37 and capacitors 38. The two-conductor line connects the master module to a slave electronics module 40 that includes acquisition and conversion circuitry 42 to sample and digitize the analog seismic signals from the sensors 22.

The slave module is powered by a dc power supply 44 in the master module over the two-conductor line, each conductor connected to a terminal of the power supply through high-frequency chokes 41. A dc/dc converter 46 in the slave unit converts the dc voltage on the two-conductor line into the dc voltage levels $V_S$ required by the electronics in the slave module. Blocking capacitors 39 and high-frequency chokes 43 in the slave module isolate the dc power from the command and data signals in the same way as the capacitors 38 and high-frequency chokes 41 in the master module.

An outbound command is transmitted onto the two-conductor line and received by a differential line receiver 48 through the blocking capacitors and a transformer 45. The command is decoded in a decoder 50 to produce a command input signal (CMD IN) to the acquisition/conversion circuit 42. The CMD IN signal is interpreted by the acquisition/conversion logic to configure the acquisition system, perform diagnostics, or request certain data, for example.

Control logic 52 in the slave derives a clock signal from the decoder 50 to which a phase-locked loop (PLL) 54 locks itself. In this way, the master and slave modules are able to synchronize to each other for reliable communications. The control logic also turns the receiver 48 on to receive outbound commands and off when seismic data are transmitted inbound.

The slave unit of FIG. 1 shows four sensors connected to it by two-wire lines 56A–D. Sensor outputs are converted to digital sample values by one or more A/D converters in the acquisition/conversion unit 42. The acquisition/conversion unit formats the data into a message packet and sends it out as a digital signal (DATA OUT) containing a sequence of data in block-encoded Non-Return-to-Zero (NRZ) format to a data encoder 58. Using the derived clock from the inbound command, the control logic 52 turns on a differential line transmitter 60 to couple the encoded digital seismic data onto the master-slave telemetry interface through the transformer 45 and capacitors 39. The control logic uses the timing clock produced by the locked PLL to generate an encoded inbound data signal synchronized to the master's clock.

The inbound data signal travels over the two-conductor line 36, through the blocking capacitors 38 and transformer 37, to a differential line receiver 62 in the master module. The master control logic 34 ensures that the receiver is turned on when inbound sensor data are expected. The received telemetry data are decoded in a data decoder 64, whose timing is controlled by the master control logic 34. The digital signal DATA IN is decoded in the master data collection circuitry 26, which then transmits the packetized data on the high-speed link 24 to the recording system.

Figure 6:
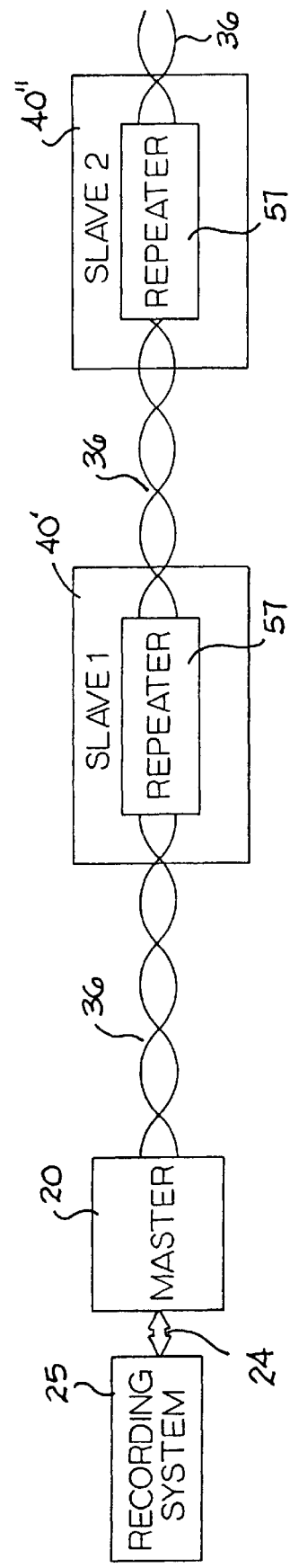
FIG. 6 is a block diagram of another version of the two-conductor telemetry interface of FIG. 1 including repeaters to permit the interconnection of a series of slave electronics modules on a single telemetry channel.

Another version of the two-conductor telemetry system is shown in FIG. 6. Repeater circuits 57 in first 40' and second 40" slave electronics modules allow slaves to be serially connected on a single data channel to the master 20 by intervening two-conductor lines 36. The repeater in each slave resynchronizes and retransmits the outbound and inbound signals and ensures that the signal amplitudes are at a sufficient level. The repeater circuits derive timing information from the outbound command circuit to lock their PLLs to the master clock. Each immediate upstream slave looks like a master to its downstream neighbor. By stringing a series of slaves with repeaters together, a single master can support multiple slave modules using two conductors.

Figure 2:
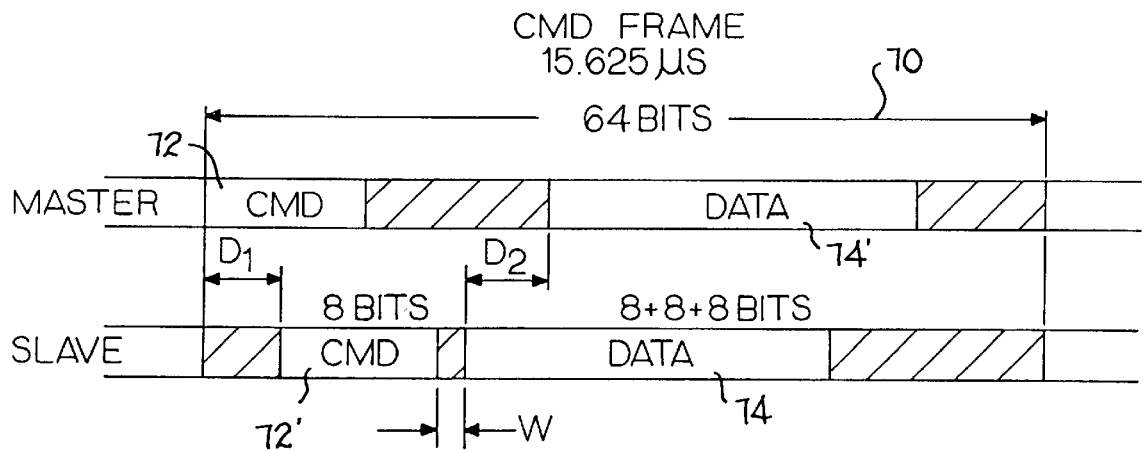
FIG. 2 is a timing diagram representing a fixed-duration timing frame used in the telemetry system of FIG. 1.

In the two-conductor bidirectional telemetry of the invention, commands are transmitted by the master 20 to the slave sensor module 40 in the outbound direction, and sensor data are transmitted in the opposite inbound direction over the same pair of conductors 36. Each command bit is encoded using a block code. The block code ensures that the signal is dc-balanced and that a level transition occurs at the sync time to help the PLL stay locked. The features of the block code used to achieve these objectives are an equal number of 0's and 1's in each code and a 0-to-1 transition in the middle of the block code. (A 1-to-0 transition could be used equivalently.) As shown in FIG. 2, outbound commands 72 and inbound data 74 are interleaved in a concatenation of individual command frames 70 in a time-division multiple-access (TDMA) scheme. With the master control logic 34 turning on the line transmitter 32 and turning off the line receiver 62, the command 72 is transmitted at a first time at the start of the command frame 70. After a delay $D_1$, determined by the length of the line 36, the command 72' is received by the slave 40, whose line receiver 48 is on and whose transmitter 60 is off as controlled by slave control logic 52. After the slave receives the command, the slave control logic turns off the receiver and turns on its transmitter. A wait interval W ensues, after which the return data 74 are sent inbound at a second time to the master, which receives the data after a delay $D_2$, wherein $D_1=D_2=D$.

In the preferred embodiment, each command frame 70 is 15.625 µs in duration, or 64 bits long at a bit rate of 4.096 Mbps. Block codes are used to encode the command and return data. Each bit of a command is encoded as an eight-bit block code at a bit rate of 4.096 Mbps. An example set of block codes for the command bit are shown in Table I. A "0" bit is represented by the block code 01001101; a "1" bit is represented by 10001110. (Of course, other codes having the desired features are possible.) Usually, only a portion, i.e., one bit (represented by eight bits of block code), of a command sequence is transmitted at the start of each command frame. Thus, it takes a number of consecutive command frames for the entirety of a command to be transmitted, except in the case of single block code commands or markers.

TABLE I

| Information | Block Code |
| --- | --- |
| Command Data bit = 0 | 01001101 |
| Command Data bit = 1 | 10001110 |
| Time Align Marker | 01001110 |

Figure 5:
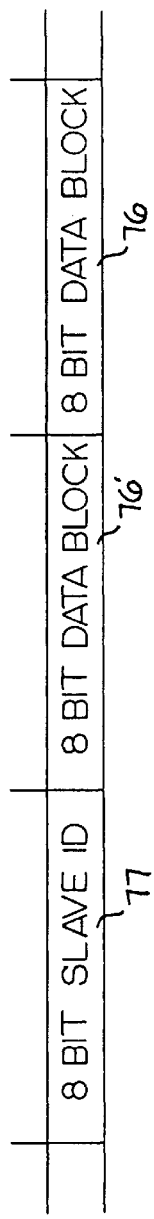
FIG. 5 is a diagram of the return data field format used in the telemetry system of FIG. 1.

The return data packet is encoded differently. During each command frame, eight bits of the sequence of seismic packet data are transmitted inbound from the slave to the master. The eight data bits are divided into two four-bit portions. Each four-bit portion is encoded by an eight-bit block code as shown in the example of Table II. The bits of the block code are clocked at 4.096 Mbps. As shown in FIG. 5, the return data in each command frame include two block-encoded eight-bit blocks 76,76' preceded by an eight-bit slave ID code 77. Thus, the return data field in each command frame is 24 bits long. Unless all the data fit in the 24-bit field, the return data, like the command, will be apportioned among a number of consecutive command frames.

TABLE II

| Four Data Bits | Block Code |
| --- | --- |
| 0000 | 01001101 |
| 0001 | 01010110 |
| 0010 | 01011001 |
| 0011 | 01011010 |
| 0100 | 01100101 |
| 0101 | 01100110 |
| 0110 | 01101001 |
| 0111 | 01101010 |
| 1000 | 10010101 |
| 1001 | 10010110 |
| 1010 | 10011001 |
| 1011 | 10011010 |
| 1100 | 10100101 |
| 1101 | 10100110 |
| 1110 | 10101001 |
| 1111 | 10110010 |

Because only one command bit is encoded in each command frame, the effective command data transmission rate is 64 kbps. The slave's control logic derives a 64 kHz signal from the command transmission to keep the PLL in sync. Because eight data bits of the sequence of seismic packet data (two four-bit blocks) are transmitted inbound in each command frame, the effective return data transmission rate is 512 kbps.

From FIG. 2, the length of line that can be used with this telemetry scheme can be derived as 2D+W<[Frame−(Cmd+Data)], where all values are in bits, or 2D+W<64−(8+8+8+8), or 2D+W<32. Thus, as shown in Table III, collisions between outbound commands and inbound data are not a problem for common station (master-to-slave) spacings.

TABLE III

| Cable Length | Cable Length | Two Way Time | Two Way (2 * D) |
| --- | --- | --- | --- |
| 55 m station spacing (cable length) | | | |
| 1 station | 55 m | 550 ns | 2.3 bits |
| 2 station | 110 m | 1100 ns | 4.5 bits |
| 3 station | 165 m | 1650 ns | 6.7 bits |
| 88 m station spacing (cable length) | | | |
| .5 station | 44 m | 440 ns | 1.8 bits |
| 1 station | 88 m | 880 ns | 3.6 bits |
| 2 station | 176 m | 1760 ns | 7.2 bits |
| 2.5 station | 220 m | 2200 ns | 9.0 bits |
| 3 station | 264 m | 2640 ns | 10.8 bits |

Figure 3:
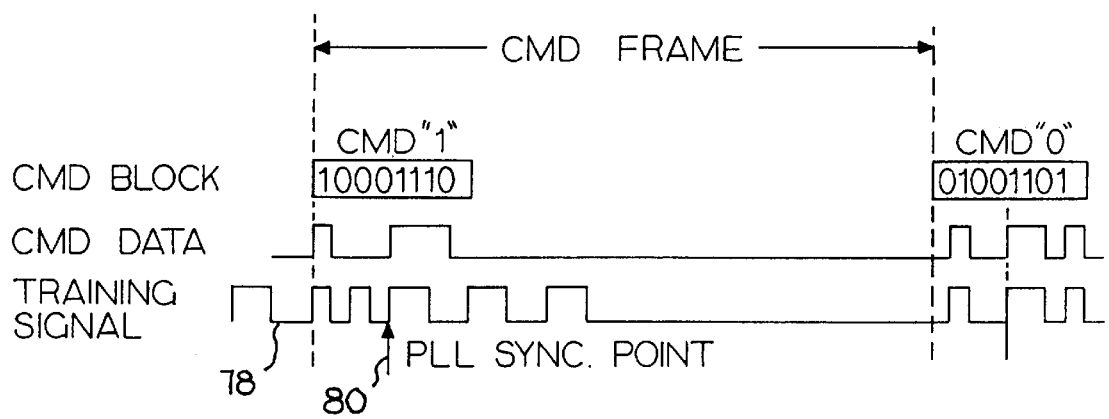
FIG. 3 is a timing diagram illustrating the relationship between a training signal and a command signal in a telemetry system as in FIG. 1.

To lock the PLL 54 in the slave to the clock 35 in the master, the master transmits a long training sequence whenever the slave loses lock. The training sequence 78, which is illustrated in FIG. 3, has the pattern "1100" for about 8 ms until the training sequence sync code "10101100" is inserted, followed by about two final cycles of the training sequence. After the training sequence is transmitted, the normal command sequence begins. Each bit of the training sequence is clocked at a 4.096 MHz rate. This means that the training sequence is a 1.024 MHz square wave until the sync code. The slave derives a sync point from the rising transition 80 in the middle of the timing sequence sync code.

A more detailed description of the use of the training sequence and waking up the slave is as follows: First, the master turns on power to the slave. After waiting for the slave to initialize itself, the master turns on its transmitter and transmits the training signal. The slave, its receiver on after initialization, finds the training signal pattern after a number of cycles. The slave enables its PLL and waits for it to lock to the outbound training signal. Once its PLL is locked, the slave waits for the sync signal (10101100) to set the start of the command frame. The master then transmits subsequent command packets at 15.625 μs intervals after the sync signal. The master stops transmitting the training signal and starts transmitting command frames every 15.625 μs. The slave waits for the master to assign it a slave ID before the slave transmits data fields back to the master. At this point, the slave is in the operating mode, alternately receiving commands and transmitting data. The interleaved transmission of commands to the slave and data packets to the master as shown in FIG. 2 continues.

Each command bit starting each command frame is represented by an eight-bit block code. The eight bits straddle the PLL sync point as shown in FIG. 3. To keep the PLL locked, the command bits include a low-to-high transition in mid-block. The transition is present in command blocks of "0" and "1." The PLL is defined to be locked when the low-to-high transition of the training signal or the command block of a command frame has occurred at the sync point for a number of consecutive command frames. This lock detect is implemented, in a preferred embodiment, with a counter in the slave control logic 52 that is incremented by one each time the transition of the training signal or the command block occurs within a lock window and is decremented by four each time the transition is outside the window. The lock window is one command bit wide and centered on the PLL sync point 80. Once the counter has reached its maximum value and the PLL is locked, it takes two consecutive command frames without a synchronized transition for the PLL to lose lock.

Figure 4:
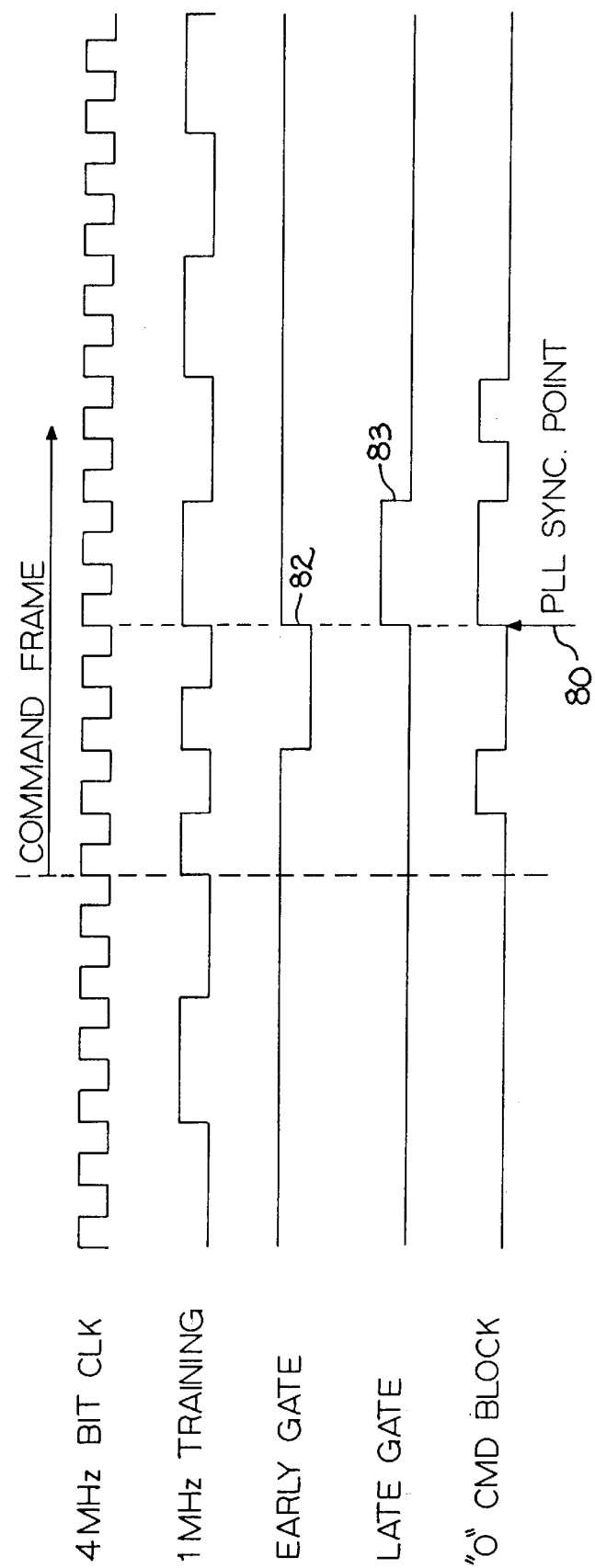
FIG. 4 is a timing diagram showing early and late gates used to control the voltage-controlled crystal oscillator (VCXO) in a slave phase-locked loop circuit in the telemetry system of FIG. 1.

The PLL's voltage-controlled crystal oscillator (VCXO) controls the frequency of the locked PLL. In FIG. 4, an early gate 82 signal and a late gate 83 signal in the slave control logic 52 are used to determine if the PLL frequency has shifted relative to the master clock. If the command block transition occurs during the early gate, the voltage to the VCXO is adjusted to advance the phase of the PLL to get it back in sync. If the command block transition occurs during the late gate, the voltage to the VCXO is adjusted to retard the phase of the PLL to resync it. As the PLL sync point is adjusted in the slave, the early and late gates are shifted accordingly.

The command field, or block, in each command frame consists of the eight-bit code of Table I. In addition to codes for logic "0" and "1," there is another eight-bit code called a Time Align marker. The master transmits the Time Align marker once per data record or as required as a timing reference for all the slave sensor modules. The Time Align marker is used to realign timers in all of the modules to the same scan timing and is particularly useful in systems in which the slave electronics modules have free-running clocks rather than PLLs. Like the block codes for "0" and "1," the block code for the Time Align marker includes a low-to-high transition at mid-block and an equal number of 1's and 0's.

The return data from each slave is transmitted inbound to the master in a 24-bit data field as formatted in FIG. 5, for example. The data block may vary in size depending on the number of sensor channels, e.g., four for the arrangement of FIG. 1. An end block contains conventional packet error detection code, such as a cyclical redundancy code (CRC) for the entire packet. The CRC could be eight or sixteen bits.

Thus, the telemetry interface described requires only a single two-conductor line to send commands and power to a remote sensor module, as well as to receive sensor data from the module.

Although the invention has been described in detail with respect to a preferred version, other versions are possible. For example, a master module can support more than one telemetry channel. A separate two-conductor line can be dedicated to each slave channel. An individual duplicate differential line transmitter and receiver circuit and transformer in the master electronics module would be dedicated to each slave data channel. The block codes described are exemplary only; other versions are possible. Delivery of power from the master to the slave is described as being dc voltage, but can also be implemented using dc current, ac voltage, or ac current. The slave module can contain a battery to supply at least a portion of the electrical power to the slave module. Therefore, the spirit and scope of the claims should not be limited to the description of the preferred version.

What is claimed is:

1. A seismic telemetry interface, comprising:
   a master electronics module;
   a slave electronics module;
   a two-conductor line connecting the master electronics module to the slave electronics module; and
   wherein the master electronics module transmits at least a portion of a digital command to the slave electronics module over the two-conductor line at a first time and the slave electronics module transmits a portion of a digital data sequence to the master electronics module over the two-conductor line at a different second time and wherein the master electronics module supplies at least a portion of the electrical power to power the slave electronics module over the two-conductor line.

2. A seismic telemetry interface as in claim 1 wherein the master electronics module transmits consecutive portions of a digital command at fixed intervals.

3. A seismic telemetry interface as in claim 2 wherein the consecutive portions of a digital command are encoded to provide digital level transitions defining sync points occurring at the fixed intervals.

4. A seismic telemetry interface as in claim 1 wherein the master electronics module transmits at least a portion of digital commands at fixed intervals defining contiguous frames, the first time marking the start of a frame and the second time occurring later in the frame.

5. A seismic telemetry interface as in claim 1 wherein the master electronics module includes a master clock and wherein the slave electronics module includes a phase-locked loop.

6. A seismic telemetry interface as in claim 5 wherein the master clock in the master electronics module includes a phase-locked loop.

7. A seismic telemetry interface as in claim 6 wherein the slave electronics module derives timing information from the digital command to lock the phase-locked loop in the slave electronics module to the master clock.

8. A seismic telemetry interface as in claim 5 wherein the slave electronics module derives timing information from the digital command to lock the phase-locked loop in the slave electronics module to the master clock.

9. A seismic telemetry interface as in claim 8 wherein the digital command is encoded with digital level transitions spaced at fixed intervals to provide the timing information to lock the phase-locked loop in the slave electronics module.

10. A seismic data acquisition system, comprising a plurality of seismic sensors sending seismic signals to the slave electronics modules and using the seismic telemetry interface of claim 1.

11. A seismic telernetxy interface, comprising:
    a master electronics module, including a power supply;
    a first slave electronics module;
    a second slave electronics module;
    a first line composed of at most two conductors electrically interconnecting the master electronics module to the first slave electronics module; and
    a second line composed of at most two conductors electrically interconnecting the first slave electronics module to the second slave electronics module;
    wherein the first slave electronics module transmits at least a portion of a digital data command to the second slave electronics module over the second line at a first time and the second slave electronics module transmits at least a portion of a digital data sequence to the first slave electronics module over the second line at a different second time, and wherein the power supply in the master electronics module supplies at least a portion of the electrical power to the first slave electronics module over the first line.

12. A seismic telemetry interface as in claim 11 wherein the master electronics module includes a master clock and wherein the first and second slave electronics modules each include a phase-locked loop.

13. A seismic telemetry interface as in claim 12 wherein the master clock in the master electronics module further includes a phase-locked loop.

14. A seismic telemetry interface as in claim 12 wherein the second slave electronics module derives timing information from the digital command from the first slave electronics module to lock the phase-locked loop in the second slave electronics module to the phase-locked loop in the first slave electronics module.

15. A seismic data acquisition system, comprising first and second pluralities of seismic sensors sending seismic signals to the first and second slave electronics modules, and using the seismic telemetry interface of claim 11.

16. A seismic telemetry interface, comprising:

a master electronics module including a master clock;

a slave electronics module including a phase-locked loop;

a two-conductor line connecting the master electronics module to the slave electronics module; and wherein the master electronics module transmits a portion of a digital command to the slave electronics module over the two-conductor line at a first time and the slave electronics module transmits a portion of a digital data sequence to the master electronics module over the two-conductor line at a different second time.

17. A seismic telemetry interface as in claim 16 wherein the master electronics module transmits consecutive portions of a digital command at fixed intervals.

18. A seismic telemetry interface as in claim 17 wherein the consecutive portions of a digital command are encoded to provide digital level transitions defining sync points occurring at the fixed intervals.

19. A seismic telemetry interface as in claim 16 wherein the master electronics module transmits portions of digital commands at fixed intervals defining contiguous frames, the first time marking the start of a frame and the second time occurring later in the frame.

20. A seismic telemetry interface as in claim 16 wherein the master clock in the master electronics module includes a phase-locked loop.

21. A seismic telemetry interface as in claim 16 wherein the slave electronics module derives timing information from the digital command to lock the phase-locked loop in the slave electronics module to the master clock.

22. A seismic telemetry interface as in claim 16 wherein the digital command is encoded with digital level transitions spaced at fixed intervals to provide the timing information to lock the phase-locked loop in the slave electronics module.

23. A seismic telemetry interface as in claim 16 wherein the master electronics module further comprises a power supply coupled to the two-conductor line to supply power to the slave electronics module.

24. A seismic data acquisition system, comprising a plurality of seismic sensors sending seismic signals to the slave electronics module and using the seismic telemetry interface of claim 16.

* * * * *